United States Patent
Richter

(10) Patent No.: US 10,048,759 B2
(45) Date of Patent: Aug. 14, 2018

(54) INPUT DEVICE, PARTICULARLY COMPUTER MOUSE

(75) Inventor: Wolfgang Richter, Starnberg (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 944 days.

(21) Appl. No.: 12/517,279

(22) PCT Filed: Aug. 20, 2008

(86) PCT No.: PCT/EP2008/006860
§ 371 (c)(1),
(2), (4) Date: Jun. 2, 2009

(87) PCT Pub. No.: WO2009/024339
PCT Pub. Date: Feb. 26, 2009

(65) Prior Publication Data
US 2010/0001955 A1    Jan. 7, 2010

(30) Foreign Application Priority Data

Aug. 20, 2007  (DE) .......................... 10 2007 039163
Dec. 12, 2007  (DE) .................... 20 2007 017 303 U

(51) Int. Cl.
G06F 3/01       (2006.01)
G06F 3/0354    (2013.01)
G06F 3/041     (2006.01)

(52) U.S. Cl.
CPC .......... *G06F 3/017* (2013.01); *G06F 3/03543* (2013.01); *G06F 3/041* (2013.01)

(58) Field of Classification Search
CPC ...... G06F 3/033; G06F 3/017; G06F 3/03543; G06F 3/041

(Continued)

(56) References Cited

U.S. PATENT DOCUMENTS 5,600,253 A * 2/1997 Cohen ....................... G01S 7/02
                                                         324/644
6,061,050 A * 5/2000 Allport ................. G06F 1/1626
                                                         345/156

(Continued)

FOREIGN PATENT DOCUMENTS

DE    102007016408    10/2008
DE    102007020873    10/2008

(Continued)

OTHER PUBLICATIONS

Japanese Office Action (English Translation), Japanese Patent Application No. 2010-521359, 6 pages, dated Sep. 4, 2012.

(Continued)

*Primary Examiner* — Sahlu Okebato
(74) *Attorney, Agent, or Firm* — Slayden Grubert Beard PLLC

(57) ABSTRACT

The invention refers to an input device for computer system. The invention is based on the task of creating solutions to make it possible to considerably simplify mouse-based input operations in the use of computers. This task is solved in accordance with the invention by a computer mouse with a housing and a movement detector to generate control data which as such correlate with the movement of the housing along the X or Y axis, and a hand detector to generate control data which as such correlate with the position and/or the finger gestures of a hand in relation to the housing before the computer mouse is touched. This makes it advantageously possible to carry out input operations to an even better degree with a computer mouse, in particular cursor controls, in a way that can be intuitively and easily mastered.

25 Claims, 2 Drawing Sheets

(58) Field of Classification Search
USPC .......................................... 345/163, 157–158
See application file for complete search history.

(56) References Cited

U.S. PATENT DOCUMENTS

| | | | | |
|---|---|---|---|---|
| 6,374,145 | B1* | 4/2002 | Lignoul | G06F 21/84 |
| | | | | 700/17 |
| 6,703,599 | B1* | 3/2004 | Casebolt | G06F 1/3203 |
| | | | | 250/221 |
| 6,816,150 | B2 | 11/2004 | Casebolt et al. | 345/166 |
| 6,859,141 | B1* | 2/2005 | Van Schyndel | G01S 13/04 |
| | | | | 324/658 |
| 7,286,118 | B2 | 10/2007 | Van Berkel | 345/173 |
| 7,821,274 | B2* | 10/2010 | Philipp et al. | 324/662 |
| 2002/0109672 | A1* | 8/2002 | Kehlstadt | G06F 3/03543 |
| | | | | 345/157 |
| 2003/0210258 | A1* | 11/2003 | Williams | 345/700 |
| 2005/0057500 | A1* | 3/2005 | Bohn | 345/156 |
| 2005/0200603 | A1* | 9/2005 | Casebolt et al. | 345/157 |
| 2005/0248534 | A1* | 11/2005 | Kehlstadt | 345/163 |
| 2006/0109252 | A1* | 5/2006 | Kolmykov-Zotov et al. | 345/173 |
| 2006/0161871 | A1* | 7/2006 | Hotelling et al. | 715/863 |
| 2007/0200823 | A1* | 8/2007 | Bytheway et al. | 345/160 |
| 2007/0211022 | A1* | 9/2007 | Boillot | G06F 3/0325 |
| | | | | 345/156 |
| 2007/0247424 | A1* | 10/2007 | Jacob | 345/158 |
| 2008/0006454 | A1* | 1/2008 | Hotelling | G06F 3/03547 |
| | | | | 178/18.06 |
| 2009/0146953 | A1* | 6/2009 | Lou et al. | 345/163 |
| 2011/0279397 | A1* | 11/2011 | Rimon | G06F 3/044 |
| | | | | 345/173 |

FOREIGN PATENT DOCUMENTS

| | | | |
|---|---|---|---|
| EP | 1241558 A2 | 9/2002 | G06F 3/033 |
| GB | 1529862 A | 10/1978 | H03K 17/955 |
| GB | 2286247 A | 8/1995 | B60N 2/00 |
| JP | 07295735 A | 11/1995 | B60N 2/00 |
| JP | 2000048694 A | 2/2000 | H01H 36/00 |
| JP | 2003-223273 A | 8/2003 | G03F 7/004 |
| JP | 2004-530993 A | 10/2004 | G06F 3/033 |
| WO | 2006/003586 A2 | 1/2006 | H05B 41/00 |

OTHER PUBLICATIONS

International Search Report and Written Opinion, Application No. PCT/EP2008/006860, 15 pages, dated Nov. 5, 2009.
Japanese Office Action, Application No. 2010-521359, 5 pages, dated Jan. 8, 2013.
Korean Office Action, Application No. 1020107006180, 6 pages, dated Jun. 30, 2014.
Korean Office Action, Application No. 1020107006180, 8 pages, dated Jul. 31, 2015.
Japanese Office Action, Application No. 2010521359, 7 pages, dated Aug. 20, 2013.
Korean Office Action, Application No. 10-2010-7006180, 9 pages, dated Feb. 28, 2015.
German Office Action, Application No. 102007039163.5, 8 pages, dated Aug. 9, 2016.

* cited by examiner

INPUT DEVICE, PARTICULARLY COMPUTER MOUSE

CROSS REFERENCE TO RELATED APPLICATIONS

This application is the US national phase of PCT application PCT/EP2008/006860, filed 20 Aug. 2008, published 26 Feb. 2009 as WO2009/024339, and claiming the priority of German patent application 102007039163.5 itself filed 20 Aug. 2007 and PCT patent application PCT/EP2008/006860 itself filed 20 Aug. 2008, whose entire disclosures are herewith incorporated by reference.

The invention refers to an input device for a computer system. In particular the invention involves an input device in the form of a computer mouse which as such allows the realization of input operations when using a computer, in particular in CAD applications, word and image processing, programming work, calculation applications, Internet navigation and games.

These types of input devices, generally known as the computer mouse, usually allow the generation of X/Y control data by the corresponding movement of the mouse on or against an underlay. Computer mice also have keys with which selection operations can be executed. They also often have a scroll wheel with which input signals can also be generated.

The problem with using a mouse as an input device is that, for the usual scaling settings, a relatively large movement area has to be available on the underlay. In the case of large "translation ratios" there is a problem that the precise positioning of a cursor demands a considerable degree of precise motor coordination.

The invention is based on the task of creating solutions to make it possible to considerably simplify mouse-based input operations in the use of computers.

This task is solved in accordance with the invention by a computer mouse with a housing and a movement detector to generate control data which as such correlate with the movement of the housing along the X or Y axis, and a hand detector to generate control data which as such correlate with the position and/or the finger gestures of a hand in relation to the housing before the computer mouse is gripped or touched.

This makes it advantageously possible to carry out input operations to an even better degree with a computer mouse, in particular cursor controls, in a way that can be intuitively and easily mastered.

With the concept in accordance with the invention, the mouse can also assume the function of a "virtual" joystick.

In accordance with a special aspect of the present invention, the computer system is configured in such a way that when the touchless function is used a small display window, for example at the bottom right corner, informs the user which interpretation or evaluation schemes are currently being used for the implementation of the position detection or gesture interpretations or where a cursor is currently roughly pre-positioned.

In an initial distance-height level of, for example, 11 cm above a mouse mat, movements of the user's hand can be resolved in the X or Y direction and certain gestures can be recognized. Any lower than this height criterion, which is preferably set individually by the user, or when the mouse is touched, the gesture-specific setting is frozen and the further generation of movement-correlated control data only takes place when the mouse is guided and physically moved.

Certain basic functions can be selected with the touchless gesture input which are then executed when the mouse is touched and moved in accordance with the movement-correlated control data. For example, a virtual eraser, a font type or a drawing tool could be selected from a symbol panel by gesture-based control. Then the tool or the format concept is used in accordance with the movement-correlated control data.

This makes it possible in particular, to call up menu commands by gestures and hand movements from a window activated by the proximity of the hand to the mouse, and then to work with these selections. At a certain proximity state it is possible, for example in a word processing program, to access an upper symbol bar and its pull-down menus. When the mouse is touched, the selected formatting tool is active for the cursor.

By the recognition of gestures or hand movements, X/Y cursor control data can also be generated in advance which can be directly implemented in order to execute a rough navigation in the overall picture area. When the mouse is gripped, the precise navigation from the last established point takes place in the conventional manner.

Otherwise, the signals gained by the computer mouse in accordance with the invention by registration of the X, Y and, preferably, the Z information on the relative position of the hand of the user in relation to the mouse can be used in various software-based ways to coordinate input operations.

The user interface can, in particular, be designed in such a way that various buttons or fields visualized in the user interface can be selected by a cross-movement of the input hand. The user interface can also be designed in such a way that, in addition to the resolution of the cross-movement, the longitudinal movement and, preferably, the depth movement can also be registered. The registration of the cross and longitudinal movement makes it possible to move two-dimensionally in a certain menu window. The detection of the depth movement makes it possible, in particular, to gain access to various menu windows. The user interface can also be designed in such a way that the selection operations are generated by pronounced hand movements, in particular pronounced alterations of the Z-axis information. It is also possible to detect certain gestures and to derive the selection of the user interface or certain other commands.

The computer mouse in accordance with the invention can be designed in such a way that the detection of the hand position and the gestures is based on electric fields. It is, in particular, possible to integrate the body of the user as such in the signal transfer system by, for example, coupling a dielectric current event in the user, whereby a signal transfer path is realized via the user to a connection point, for example a keyboard, a hand rest, a table frame, a stool or some other receiver electrode preferably connected to the computer system via a USB port.

The computer mouse can also have optical elements, in particular light-emitting diodes, with which additional optical information, e.g. feedback information on completed input operations or current system functions can be visualized.

The whole signal-processing structure can be configured in such a way that the movement or the implementation of the input operation also takes into account so-called ballistic effects, so that a rapid movement of the operation hand causes the cursor in the corresponding window to cover larger distances and come to a halt accordingly in a ballistic function (i.e. decelerates in accordance with a negative acceleration factor a). The detection field is preferably dimensioned in such a way that it covers an area of approx.

18×18 cm, as within this area an especially rapid movement of the operation hand can be achieved by tilting and turning the wrist.

It is possible to design the system in such a way that the touchlessly generated control data lead to an event when the other hand of the user triggers a switch event, in particular by touching a keypad or a key.

It is possible to define a particular proximity track profile which allows activation of the computer mouse without activation of the gesture detection system. Such a proximity profile can, for example, be a sideward approach of the hand to the mouse at low level.

In particular in combination with the abovementioned measures, or also as an alternative to them, a further aspect of the present invention provides for the integration of a proximity detector in the computer mouse, whereby the switch structures dominating in terms of the electric power consumption are switched on or off on the basis of the detection events generated by this proximity detector. This makes it possible, in particular in wireless mice, to extend the running time of a voltage source integrated in the mouse compared with concepts up to now. To realize this concept it is possible to provide two electrodes attached to the inner side of the upper shell of the mouse housing. The electrodes are preferably connected to an oscillator. The electrodes are executed in terms of their dimensions and their geometric arrangement to each other and to the human hand in such a way that the feedback necessary for the oscillation in the circuit only occurs in the event of a certain approach or, as applicable, only when a human hand is laid on the mouse, i.e. the oscillation circuit only becomes active when the hand is on the mouse The alternating current component of the output voltage of the oscillator circuit can represent the switch-on signal for the rest of the mouse electronics. The switch-on signal can be gained, for example, by the rectification of the abovementioned alternating voltage. The oscillator circuit is preferably executed in such a way that its transistors are locked in the idle state and only consume the minimum amount of closed-circuit current. This ensures, in a particularly advantageous manner, a long battery life. The electrodes are preferably attached near to the part of the housing contacted by the hand of the user and have a relatively large surface area.

In accordance with a further aspect of the invention, it is possible to provide two electrodes on the circuit board of the mouse, e.g. a send electrode on the left and a receive electrode on the right. The send electrode is connected to an oscillator circuit, the receive electrode to an amplifier. The electrodes are arranged in such a way that when a human hand is laid on the mouse, the hand forms a capacitive bridge between the electrodes. The send electrode is, for example capacitively coupled with the thumb and the receive electrode with the little finger. In this set-up, an alternating voltage appears on the receiver side when a hand is laid on the mouse due to the transfer of the send signal via the human body. To improve the signal/noise ratio, synchronous modulation can be realized by circuits integrated directly in the circuit board. To achieve maximum energy-savings, the system can be pulse-controlled. The internal mouse electronics is switched on similar to the way explained above.

With regard to a particularly advantageous embodiment of the hand detector and the details of the circuits, reference is made to the patent applications of the applicant DE 10 2007 016 408 und DE 10 2007 020 873. The disclosure content of these applications is fully included in the present patent application by the reference made to it here.

In accordance with a further aspect of the present invention it is possible to realize the computer mouse as a whole as a mobile communicator with its own display. This communicator can be configured in such a way that the gesture-based input selections are visualized in the display of the mouse. This means that it is possible to execute mouse-based input operations, in particular menu item selections, without disturbing the image on the main screen. This computer mouse executed as a mobile communicator can be designed in such a way that it is equipped with a wireless interface, in particular a WLAN-Port, via which special authorization information or coding data can be provided. Insofar as this communicator is equipped with a camera, it is advantageously possible to realize it in such a way that the camera can be used as a sensor for an optical movement path detection.

The present invention thus includes also the use of a mobile phone equipped with a gesture detector as a computer mouse.

Further details and features of the invention are set out in the following description in conjunction with the drawings. These are as follows:

FIG. 1 a perspective drawing of computer system realized using a computer mouse in accordance with the invention FIG. 2a a basic diagram to illustrate a "leaf-forward gesture"

FIG. 2b a basic diagram to illustrate a "leaf-back gesture."

The computer system shown in FIG. 1 comprises a computer mouse 1 and a display 2 which in this embodiment example is executed as a flat screen. In terms of its outer appearance, the computer mouse 1 in this embodiment example looks like an ordinary computer mouse and has the typical input keys 3, 4 and a scroll wheel 5.

A graphic user interface determined by the program being used is provided on the display 2. Purely as an example, a cursor 6, represented here as an arrow, can be moved in this user interface.

The computer mouse 1 shown here is characterized by the fact that, alongside a movement detector to generate control data which as such correlate with the movement of the housing along the X or Y axis, it also has a hand detector to generate control data which as such correlate with the position of a hand in relation to the housing before the computer mouse is touched Even before the mouse is touched, cursor movements or selection operations can be executed in the user interface provided by the display 2 with the hand R shown here (purely as an example, here the right hand) by touchless movement of the hand or of the outstretched index finger F on the virtual input plane E shown here. In the embodiment example shown here, the system is coordinated in such a way that the width B and the length L of the virtual input plane E correspond to the total extent of the display in the respective directions. This means that at least approximate cursor pre-positioning is possible before the mouse is touched.

The computer mouse 1, i.e. the computer system realized with it, is also designed in such a way that selection operations, in particular those generated by pronounced movements of the operation hand R or the finger F, can be executed in a direction normal to the input plane E (Z-axis.).

Furthermore, as mentioned above, the computer mouse in accordance with the invention is also provided with input devices in the form of pushbuttons 3 and 4 via which further input operations can be effected.

The computer system provided for the use of the mouse 1 can be designed in such a way that the hand position sensor 7 triggers a gesture-based positioning of a "second-class cursor", whereby this second-class cursor is assumed by a certain selection gesture—e.g. pronounced lowering of the hand toward the mouse—and then finally and precisely positioned with a movement of the mouse.

With the computer mouse 1 shown here, a reliable and rapidly coordinatable execution of input operations can be realized in the virtual input plane E which are directly implemented via a classical user interface on a touchless basis by relatively imprecise movement of the operation hand R.

The sensor 7 for detection of the movement of the operation hand R in relation to the computer mouse 1 is preferably integrated directly in the computer mouse 1, in particular on the underside of its housing shell 7a. This sensor 7 can, in particular, be designed in such a way that the movement and the position of the operation hand R is detected with the aid of electric field interaction effects.

It is possible to realize a cursor structure within the reproduction area of the display in accordance with the hand and finger movement. It is also possible to move certain menu items to the central area of the display in accordance with the hand or finger movement, and then to select them on entering the central window. It is also possible to combine these two approaches so that, for example when a certain margin limit zone is reached, e.g. a borderline running at a distance of approx. 20% of the screen diagonal to the display edge, a new window appears and then X/Y-navigation and, as necessary, a Z-zoom can also be executed in this new window.

The computer mouse 1 or the computer system realized with it can be designed in such a way that it also interprets certain finger gestures such as occur on writing on a virtual keyboard. In accordance with a special aspect of the present invention, the interpretation of the hand and finger gestures can be realized using voice recognition programs. For this purpose it is possible to generate signals with the detection electronics integrated in the computer mouse which are in the frequency range of the human voice and correlate sufficiently clearly with X, Y and, as applicable, Z movements. These "sound signals" generated via the gesture sensor can be led into the sound card input in most computers and made available from there to the evaluation software.

Under the housing shell—broken open here for illustration purposes—there is an electrode structure 8, which, as applicable, can also be attached directly below a non-conductive surface of the mouse housing. This electrode structure 8 makes it possible to detect the X and Y movements as well as the Z movements of the operation hand R in relation to the mouse housing and to generate the necessary X/Y and, as applicable, Z signals within the user interface.

The electrode structure 8 includes a feed electrode 9, a screening electrode and several detection electrodes 11, 12, 13. The feed electrode 9 generates a modulated E-field which extends into the area above the mouse 1 accessible to the operation hand R. The screening electrode prevents a direct field-electric coupling of the field generated by the feed electrode 9 with the detection electrodes 11, 12, 13. The position of the operation hand R and the relative movement thereof in relation to the feed electrode 9 can be detected via the field electrodes 11, 12, 13. For this purpose the detection electrodes 11, 12, 13 are connected to an evaluation circuit 14, which preferably executes an evaluation of the detection events, in particular the strength of the electric field at the respective electrode 11, 12, 13, on the basis of several different evaluation concepts. The detection electrodes 11, 12, 13 are preferably parts of LC networks. The evaluation concepts can include, in particular, the measurement of currents, voltage, phase angles of current and voltage in relation to each other and in relation to excitation systems, and capacities in the corresponding sections of the LC networks.

The display 2 is controlled by a computer not shown here. This control of the display 2 is realized in the embodiment example shown here in such a way that the display forms an advantageous user interface for the execution of input operations which is intuitively and quickly comprehensible.

Figure 1:
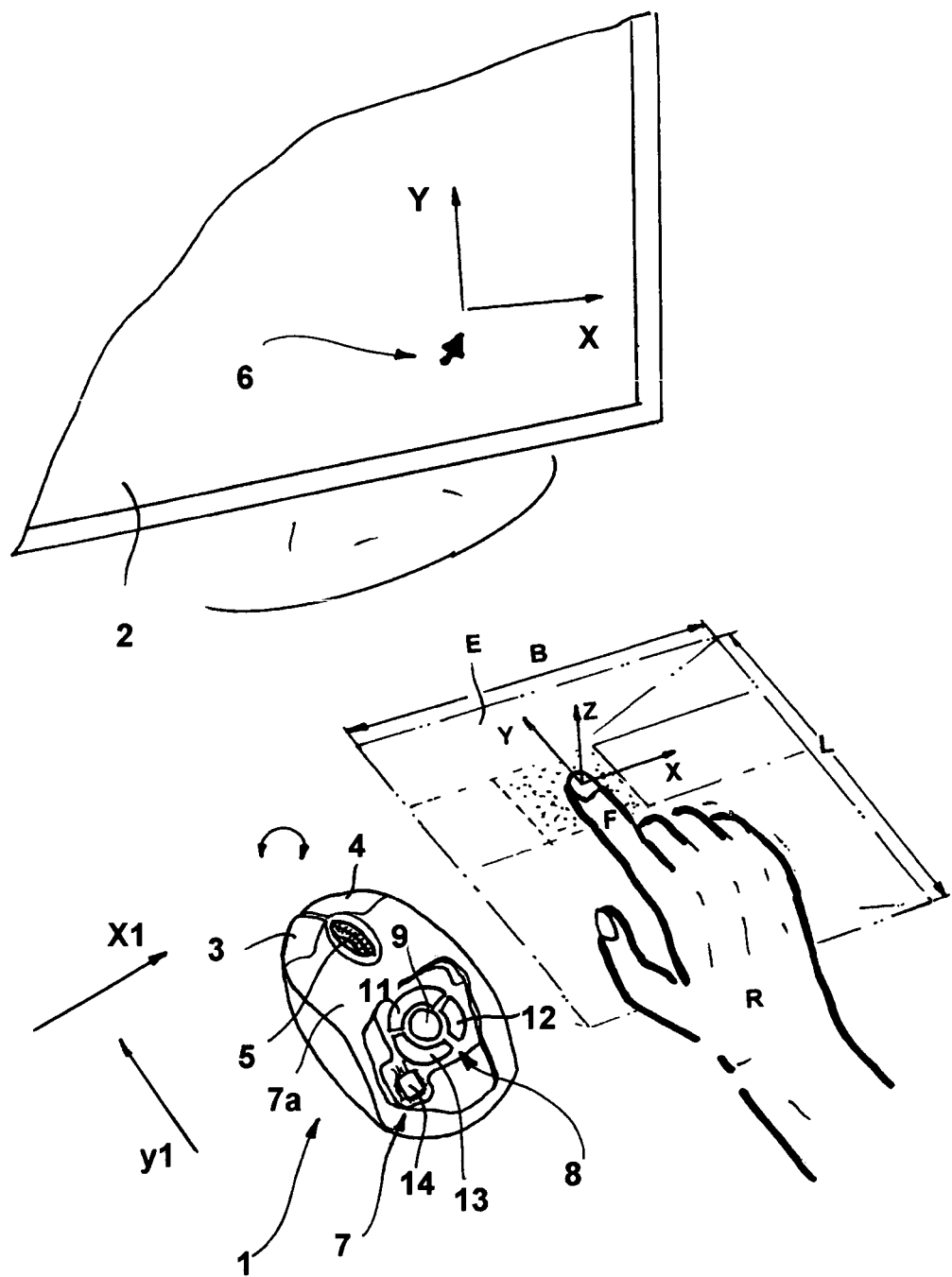
Figure 2A:
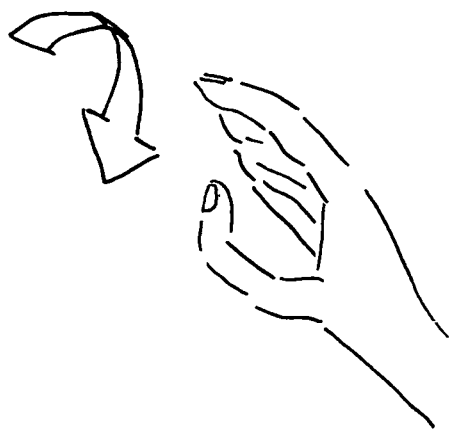
FIG. 2a shows, in highly simplified terms, a hand movement corresponding to a typical "leafing movement" which can be recognized by the computer mouse in accordance with the invention.
Figure 2B:
FIG. 2b shows, in highly simplified terms, a hand movement corresponding to a typical "leaf-back movement" which can be recognized by the computer mouse in accordance with the invention.

In particular, this user interface can be set up in such a way that it forms several windows, whereby at least part of these windows is realized in such a way that a two-dimensional shift of a cursor or other two-dimensional navigation is possible in these windows. In accordance with the invention, the X/Y information for the movement of the cursor structure 6 within the screen is generated by the sensor 7 integrated directly in the computer mouse 1. This sensor 7 is designed in such a way that it allows the movement of an operation hand within an operation space (see FIG. 1) above the computer mouse 1.

With regard to a particularly advantageous embodiment of the hand detector reference is made to the patent applications of the applicant DE 10 2007 016 408 und DE 10 2007 020 873. The disclosure content of these applications is fully included in the present patent application by the reference made to it here.

The invention claimed is:

1. A computer mouse comprising:
    a housing,
    a first input device generating first control data configured to control at least a cursor on a display of a computer system and comprising a movement detector to generate the first control data which as such correlate with the movement of the housing along an X1 and a Y1 axis, and
    a second input device generating second control data configured to control the computer system and comprising a hand detector to generate the second control data which as such correlate with the position and movement of a hand of a user in relation to the housing before the computer mouse is touched, wherein the hand detector comprises a single feed electrode having a circular shape and at least three associated detection electrodes each having a sectional ring shape, wherein the sectional ring shaped detection electrodes are arranged to form a broken ring around said circular shaped single feed electrode and coupled with an evaluation circuit, wherein the feed electrode is configured to generate a modulated electric field which extends into an area above said housing and wherein the evaluation circuit receives separate signals from the at least three sectional ring shaped detection electrodes each signal representing a strength of the modulated electric field at the respective detection electrode, and wherein the evaluation circuit is configured to determine a three-dimensional position including X, Y, and Z data from said separate signals received by the detection electrodes and to generate said second control data, wherein said second control data is used to control at least a movement of said cursor.

2. The computer system comprising a computer mouse in accordance with claim 1, further comprising a computer with said display coupled with said computer mouse, wherein control movements executed by the user in relation to the computer mouse generating said second control data are reflected in a user interface represented by the display.

3. The computer system in accordance with claim 2, wherein the user interface is designed in such a way that a cross-movement of the hand in relation to the computer mouse triggers a cursor movement along an X axis or allows the selection of various buttons.

4. The computer system in accordance with claim 2, wherein the user interface is designed in such a way that a longitudinal movement of the hand in relation to the computer mouse triggers a cursor movement along a Y axis or allows the selection of various buttons.

5. The computer system in accordance with claim 2, wherein a depth movement allows a selection of various menu windows from the user interface.

6. The computer system in accordance with claim 2, wherein a depth movement allows the selection of various menu windows or frames.

7. The computer system in accordance with claim 2, wherein a zoom function of the display is coordinated via a Z information provided by the computer mouse.

8. The computer system in accordance with claim 2, wherein a navigation is controlled by longitudinal or cross movements within a window or frame by the hand of the user.

9. The computer mouse in accordance with claim 1 wherein the evaluation circuit is configured in such a way that a selection command is derived from a certain detection event.

10. The computer mouse in accordance with claim 9 wherein the selection command is generated by a finger movement, in particular the lowering of one or more fingers of the operation hand in the direction of the computer mouse.

11. The computer mouse in accordance with claim 9, wherein the computer mouse comprises an input structure to realize manual selection by the corresponding activation of the input structure.

12. The computer mouse in accordance with claim 11, wherein the input structure is executed as a key structure which can be activated by the corresponding tipping of the mouse by a finger of the gripping hand, in particular the index finger.

13. The computer mouse in accordance with claim 1, wherein the hand detector includes a first, second and third electrode and wherein the position of the hand and/or the cross, longitudinal and/or depth movement of the hand in relation to the computer mouse is detected on the basis of differences in the field electric events at these electrodes.

14. The computer mouse in accordance with claim 1, wherein the computer mouse is configured in such a way that the length and the width of a hand movement detection area provided by said electric field and provided to determine a hand movement above said housing allow a movement of the cursor over the whole extent of the screen.

15. The computer mouse in accordance with claim 1, wherein the hand detector comprises a circuit board structure supporting said feed and detection electrodes and further comprising an ASIC arranged on the circuit board structure for the generation of the control signals on the basis of proximity effects detected by the detection electrodes.

16. The computer mouse according to claim 1, wherein hand movements within a vertical distance of approximately 11 cm can be detected by the means of the modulated electric field.

17. The computer mouse in accordance with claim 1 wherein, when the mouse is released, the mouse electronics revert to the power-saving mode immediately or with a slight delay.

18. A computer mouse comprising:
a housing,
a first input device generating first control data configured to control a computer system and comprising a movement detector to generate the first control data which as such correlate with the movement of the housing along an X1 and a Y1 axis, and
a second input device generating second control data configured to control the computer system and comprising a hand detector to generate the second control data and a signal which indicates whether the hand of a user is approaching the mouse whereby in accordance with this signal the mouse electronics switch from a power-saving mode to an operation mode, wherein the hand detector comprises a single feed electrode having a circular shape and at least three associated sectional ring shaped detection electrodes arranged to form a sectional ring around said circular shaped single feed electrode and coupled with an evaluation circuit, wherein the feed electrode is operable to generate a modulated electric field which extends at least 11 cm vertically measured from a surface on which the computer mouse is placed and wherein the evaluation circuit receives separate signals from the at least three sectional ring shaped detection electrodes to generate said second control data, wherein said second control data comprises a relative position information of the hand of the user with respect to the computer mouse including X, Y, and Z information, wherein the computer mouse is configured to output said second control data to the computer system via a computer interface.

19. The computer mouse in accordance with claim 18 wherein, when the mouse is released, the mouse electronics revert to the power-saving mode immediately or with a slight delay.

20. The computer system according to claim 2, wherein the system is operable upon an approach by the hand below a programmable threshold height to freeze an interface status determined by a previous movement of the hand and only by detection of a physical movement of the mouse the system generates further control data with respect to said interface status.

21. A computer mouse comprising:
a housing,
a first input device generating first control data configured to control a computer system and comprising a movement detector to generate the first control data which as such correlate with the movement of the housing along an X1 and a Y1 axis, and
a second input device generating second control data configured to control the computer system and comprising a hand detector to generate the second control data which as such correlate with the position and/or movement of a hand of a user in relation to the housing before the computer mouse is touched, wherein the hand detector comprises a single feed electrode having a circular shape and at least three sectional ring shaped associated detection electrodes arranged to form a ring around said circular shaped single feed electrode and coupled with an evaluation circuit, wherein the feed electrode is operable to generate a modulated electric field which extends into an area above said housing and wherein the evaluation circuit receives separate signals from the at least three sectional ring shaped detection electrodes to generate said control data, wherein said second control data comprises a relative position information of the hand of the user with respect to the computer mouse including X, Y, and Z information and wherein the movement detector only generates the control data if the movement of the hand is above a predetermined distance from said housing, wherein the computer mouse is configured to output said second control data to the computer system via a computer interface.

22. The computer mouse according to claim 21, wherein the predetermined distance is a vertical distance of approximately 11 cm measured from a bottom surface of the housing.

23. The computer mouse according to claim 1, wherein subsequent three-dimensional position data are used to determine a gesture from a plurality of gestures performed by the hand of the user without touching the computer mouse.

24. The computer mouse according to claim 18, wherein the computer interface is a wireless computer interface.

25. The computer mouse according to claim 21, wherein the computer interface is a wireless computer interface.

* * * * *